United States Patent
Yamazaki

(10) Patent No.: US 6,978,633 B2
(45) Date of Patent: Dec. 27, 2005

(54) ABSORPTION CHILLER-HEATER

(75) Inventor: Takayuki Yamazaki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 156 days.

(21) Appl. No.: 10/771,434

(22) Filed: Feb. 5, 2004

(65) Prior Publication Data

US 2004/0159116 A1  Aug. 19, 2004

(30) Foreign Application Priority Data

Feb. 7, 2003  (JP) .......................... P2003-031007

(51) Int. Cl.[7] .......................................... F25B 27/00
(52) U.S. Cl. ...................................... 62/238.3; 62/476
(58) Field of Search ............................. 62/101, 238.3, 62/324.2, 476; 165/62, 63

(56) References Cited

U.S. PATENT DOCUMENTS

| | | | | |
|---|---|---|---|---|
| 3,742,727 A | * | 7/1973 | Kaiser ............................. | 62/476 |
| 4,905,479 A | * | 3/1990 | Wilkinson ....................... | 62/271 |
| 5,271,246 A | * | 12/1993 | Yamauchi ........................ | 62/476 |
| 6,038,882 A | * | 3/2000 | Kuroda et al. ................... | 62/476 |
| 6,369,863 B1 | * | 4/2002 | Smith ............................. | 348/744 |

FOREIGN PATENT DOCUMENTS

| JP | 57-30680 U | 2/1982 |
|---|---|---|
| JP | 2002-168544 A | 6/2002 |

* cited by examiner

Primary Examiner—Melvin Jones
(74) Attorney, Agent, or Firm—Sughrue Mion, PLLC

(57) ABSTRACT

There is constructed a constitution including an exhaust gas fired regenerator constituting a heat source by exhaust gas from an external machine generating the exhaust gas, an introducing flow path for guiding the exhaust gas to the exhaust gas fired regenerator, an exhaust flow path for exhausting the exhaust gas from the exhaust gas fired regenerator, a bypass flow path branched from the introducing flow path, flow path switching device including a first damper provided at the introducing flow path and a second damper provided at the bypass flow path for switching flow of the exhaust gas to the introducing flow path and the bypass flow path, a damper provided at the exhaust flow path for cutting off the exhaust gas from flowing in the exhaust flow path and gas delivering device for blowing a gas to a portion of the exhaust flow path between the damper for cutting off the exhaust gas from flowing and the exhaust gas fired regenerator.

3 Claims, 3 Drawing Sheets

ABSORPTION CHILLER-HEATER

The present application is based on Japanese Patent Application No. 2003-31007, the entire contents of which are incorporated herein by reference.

BACKGROUND OF THE INVENTION

1. Field of the Invention

The present invention relates to an absorption chiller-heater, particularly relates to an absorption chiller-heater having an exhaust gas fired regenerator constituting a heat source by exhaust gas.

2. Related Art

According to an absorption chiller-heater having an exhaust gas fired regenerator constituting a heat source by exhaust gas, exhaust gas from an external machine generating the exhaust gas is guided to the exhaust gas fired regenerator via an introducing flow path and the exhaust gas is exhausted from the exhaust gas fired regenerator by an exhaust flow path. At this occasion, in the case in which the absorption chiller-heater is not operated while the external machine generates the exhaust gas, by heat input from the exhaust gas or the like, corrosion or the like is caused at a member constituting the exhaust gas fired regenerator due to crystallization of an absorbent solution at inside of the exhaust gas fired regenerator and occurrence of dew condensation at inside of a flow path of the exhaust gas at inside of the exhaust gas fired regenerator.

Hence, it is conceived to provide a bypass passage for making the exhaust gas flow to exhaust by bypassing the exhaust gas fired regenerator and making the exhaust gas flow to the bypass passage such that the exhaust gas does not flow to the exhaust gas fired regenerator in the case in which the absorption chiller-heater is not operated when the external machine generating the exhaust gas generates the exhaust gas. At this occasion, switching of directions in making the exhaust gas flow to the exhaust gas fired regenerator and the bypass passage is carried out by using a damper in view of a problem of cost or the like.

However, there is a limit in sealing performance of the damper in view of the structure, flow of the exhaust gas cannot completely be stopped and leakage of the exhaust gas is brought about. Therefore, by heat of the exhaust gas flowing to the exhaust gas fired regenerator by leakage of the damper, invariably, corrosion or the like is brought about at a member constituting the exhaust gas fired regenerator due to crystallization of the absorbing solution at inside of the exhaust gas fired regenerator, occurrence of dew condensation at inside of the flow path of the exhaust gas at inside of the exhaust gas fired regenerator and the like.

In contrast thereto, according to the absorption chiller-heater having an exhaust gas fired regenerator of a related art, a merged portion of a bypass flow path and an exhaust flow path is provided with two dampers of a damper on a side of the bypass flow path and a damper on a side of the exhaust flow path, flow of the exhaust gas is switched in a direction of the bypass flow path and a direction of the exhaust path fired regenerator, further, the exhaust flow path is provided with gas delivering device including a blower for blowing a gas to a portion between the damper provided at the exhaust flow path and the exhaust gas fired regenerator. Thereby, in the case in which the absorption chiller-heater is not operated when the external machine generating the exhaust gas generates the exhaust gas, the exhaust gas is guided to the bypass flow path by closing the damper on the side of the exhaust gas flow path and opening the damper on the side of the bypass flow path and the gas is delivered into the gas flow path by the gas delivering device to thereby prevent the exhaust gas from flowing into the exhaust gas fired regenerator (refer to, for example, JP-A-2002-168544 (pages 3–4, FIG. 1))

Further, there is also constructed a constitution in which the introducing flow path is provided with two dampers at an interval therebetween, dampers are provided in the bypass passage and the exhaust passage, a gas delivering device is provided at a portion between the two dampers of the introducing flow path, further, there is provided pressure detecting device for detecting a pressure difference between a pressure at the portion between the two dampers of the introducing flow path and a pressure at a portion of the introducing flow path on an upstream side of the damper disposed on the upstream side with respect to flow of the exhaust gas. In this case, when the pressure at the portion between the two dampers of the introducing flow path is higher than the pressure at the portion of the introducing flow path on the upstream side of the damper disposed on the upstream side with respect to the flow of the exhaust gas, the gas delivering device is driven to thereby prevent the exhaust gas flowing to the exhaust gas fired regenerator by leakage of the damper (refer to, for example, JP-UM-A-57-30680 (pages 4–10, FIG. 2)).

Meanwhile, according to the constitution of providing two dampers of the damper on the side of the bypass flow path and the damper on the side of the exhaust flow path and providing the gas delivering device in the exhaust flow path as in JP-A-2002-168544, the upstream side of the exhaust gas fired regenerator with respect to the flow of the exhaust gas, that is, the side of the introducing flow path is brought into an opened state. Therefore, in order to prevent the exhaust gas from invading inside of the exhaust gas fired regenerator, a comparatively large gas volume is needed for the blower provided at the gas delivering device. However, the larger the gas volume of the blower, the more increased is power consumption, noise or the like and it is necessary to restrain the gas volume of the blower as less as possible.

In contrast thereto, according to the constitution of installing the two dampers at an interval therebetween at the introducing flow path and installing the gas delivering device or the like between the two dampers of the introducing flow path as in JP-UM-A-57-30680, the gas volume of the blower can be restrained since a pressure in a closed space at the portion between the two dampers for introducing flow path may be increased. However, the constitution is complicated such that the number of the dampers is increased or the like.

SUMMARY OF THE INVENTION

The invention is directed to restrain a gas volume of a blower while simplifying a constitution.

An absorption chiller-heater of the invention comprises: an exhaust gas fired regenerator heated by an exhaust gas; an introducing flow path for introducing the exhaust gas to the exhaust gas fired regenerator; an exhaust path flow path for exhausting the exhaust gas from the exhaust gas fired regenerator; a bypass flow path branched from the introducing flow path; a flow path switching device provided on the introducing flow path for switching a flow of the exhaust gas to the introducing flow path and the bypass flow path, the flow path switching device including at least one damper; a exhaust side damper provided on the exhaust flow path for cutting off the exhaust gas from flowing in the exhaust flow path; and a gas delivering device for blowing a gas into the exhaust flow path between the exhaust side damper and the exhaust gas fired regenerator.

When such a constitution is constructed, in the case in which the absorption chiller-heater is not operated when the external machine generating the exhaust gas generates the exhaust gas, exhaust gas at the introducing flow path can be cut off from flowing by the damper provided to the flow path switching device to thereby bring about a state of making the exhaust gas flow to the bypass flow path. At this occasion, the exhaust gas is cut off from flowing in the exhaust flow path by the damper and the gas delivering device is driven, however, the gas delivering device may only be able to increase a pressure of a closed space including a flow path of the exhaust gas at inside of the exhaust gas fired regenerator between the damper for cutting off the exhaust gas from flowing in the introducing flow path and the damper for cutting off the exhaust gas from flowing in the exhaust flow path and therefore, a gas amount of the blower can be restrained. Further, a number of the dampers can be made to be smaller than that of the related art and the constitution can be simplified. That is, the gas volume of the blower can be restrained while simplifying the constitution.

Further, when there is constructed a constitution in which the flow path switching device includes a first damper provided at the introducing flow path and a second damper provided at the bypass flow path, a degree of freedom of a position of installing the damper is increased.

Meanwhile, according to a constitution of providing a damper at a merged portion of a bypass flow path and an exhaust flow path and providing gas delivering device at the exhaust flow path in the related art, it is difficult to simplify the constitution by using a three-wary damper serving as a damper on a side of the bypass flow path and a damper on a side of the exhaust flow path by a single damper. That is, when the three-way damper is used at the merged portion of the bypass flow path and the exhaust flow path, flow of the exhaust gas pushes a movable plate of the damper in an opening direction and therefore, leakage of the exhaust gas is increased and therefore, the three-way damper is difficult to be used.

In contrast thereto, when there is constructed a constitution in which the flow path switching device is a three-way damper provided at a merged portion of the introducing flow path and the bypass flow path, flow of the exhaust gas pushes the movable plate of the damper in a closing direction and therefore, leakage is not increased and the three-way damper can be used. Therefore, the number of dampers is further reduced and the constitution can further be simplified.

DETAILED DESCRIPTION OF THE PREFERRED EMBODIMENTS

Figure 1:
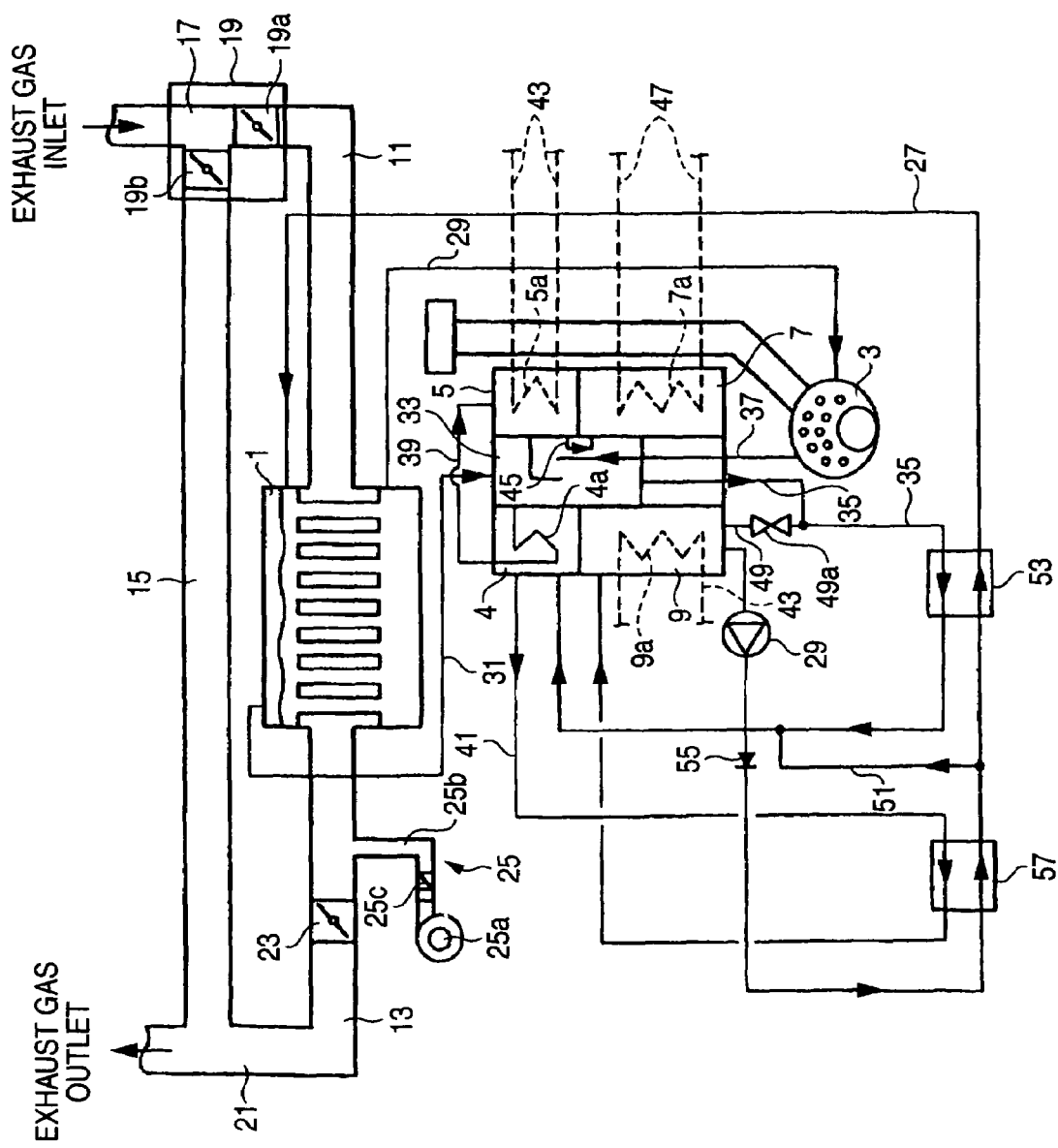
FIG. 1 is a diagrams showing an outline constitution of an embodiment of an absorption chiller-heater constituted by applying the invention.
Figure 2:
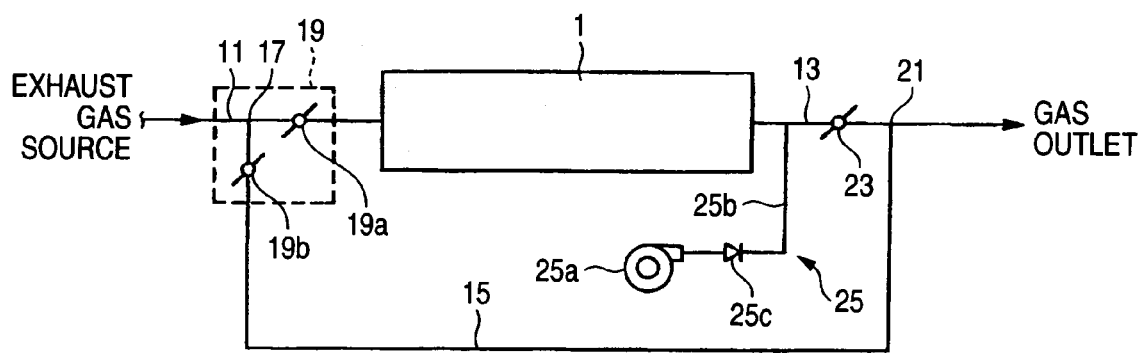
FIG. 2 is a diagram showing an outline constitution of a flow path of exhaust gas connected to an exhaust gas fired regenerator according to the embodiment of the absorption chiller-heater constituted by applying the invention.

An explanation will be given of an embodiment of an absorption chiller-heater constituted by applying the invention in reference to FIG. 1 and FIG. 2 as follows. FIG. 1 is a diagram showing an outline constitution of an absorption chiller-heater constituted by applying the invention. FIG. 2 is a diagram showing an outline constitution of an exhaust flow path connected to an exhaust gas fired regenerator of the absorption chiller-heater constituted by applying the invention.

As shown by FIG. 1, the absorption chiller-heater of the embodiment is constituted by an exhaust gas fired regenerator 1, a directly fired regenerator 3, a low temperature regenerator 4, a condenser 5, an evaporator 7, an absorber 9 and the like. The exhaust gas fired regenerator 1 is for carrying out heat exchange between exhaust gas from external machine generating exhaust gas by combustion and a diluted solution and generating a cooling medium vapor and a concentrated solution by heating the diluted solution by heat provided to exhaust gas. The exhaust gas fired regenerator 1 is installed above the directly fired regenerator 3, the low temperature regenerator 4, the condenser 5, the evaporator 7 and the absorber 9.

As shown by FIG. 1 and FIG. 2, the exhaust gas fired regenerator 1 is connected with an introducing duct 11 for guiding exhaust gas from external machine generating the exhaust gas by combustion to a flow path of the exhaust gas at inside of the exhaust gas fired regenerator 1 and the exhaust duct 13 for exhausting the exhaust gas from the flow path of the exhaust gas at inside of the exhaust gas fired regenerator 1. The introducing duct 11 and the exhaust duct 13 are connected by a bypass duct 15 branched from the introducing duct 11 and merged to the exhaust duct 13 to constitute a bypass flow path. A branch portion 17 of the introducing duct 11 and the bypass duct 15 is provided with two dampers of a first damper 19a and a second damper 19b as flow path switching device 19 for switching flow of the exhaust gas to the introducing duct 11 and the bypass duct 15. The first damper 19a is provided on a side of the introducing duct 11 of the branch portion 17. The second damper 19b is provided on a side of the bypass duct 15 of the branch portion 17.

A third damper 23 is provided at a portion of the exhaust duct 13 on an upstream side of a merged portion 21 of the bypass duct 15 and the exhaust duct 13 with respect to flow of the exhaust gas. Gas delivering device 25 is provided at a portion of the exhaust duct 13 between the third damper 23 and the exhaust gas fired regenerator 1. The gas delivering device 25 is constituted by a blower 25a for delivering a gas, a gas delivering passage 25b for connecting a blowing port of the blower 25a to the portion of the exhaust duct 13 between the third damper 23 and the exhaust gas fired regenerator 1 and a check damper 25c provided at the gas delivering passage 25b.

As shown by FIG. 1, the exhaust gas fired regenerator 1 is connected with a diluted solution passage 27 for guiding a diluted solution generated by the absorber 9 to a flow path of the diluted solution at inside of the exhaust gas fired regenerator 1. An outlet portion of the diluted solution passage 27 from the absorber 29 is provided with a pump 29 for delivering the diluted solution. A bottom portion of the exhaust gas fired regenerator 1 is connected with one end of a solution passage 29 for making the diluted solution or a middle concentration solution at inside of the exhaust gas fired regenerator 1 flow. Other end of the solution passage 29 is connected to the directly fired regenerator 3 for heating the diluted solution or the middle concentration solution by combustion of a burner. An upper portion of the exhaust gas fired regenerator 1 is connected with one end of a first cooling medium vapor passage 31 in which cooling medium vapor generated at inside of the exhaust fired regenerator 1 flows and other end of the first cooling medium vapor passage 31 is connected to a gas-liquid separator 33.

A bottom portion of the gas-liquid separator 33 is connected with one end of a middle concentration solution passage 35 for guiding the middle concentration solution stored at the bottom portion of the gas-liquid separator 33 to the low temperature regenerator 4. Other end of the middle concentration solution passage 35 is connected to the low temperature regenerator 4. The directly fired regenerator 3 is arranged at a position lower than the exhaust gas fired regenerator 1. An upper portion of the directly fired regenerator 3 is connected with one end of a liquid lifting passage 37 in which the cooling medium vapor and the middle concentration solution generated at inside of the directly fired regenerator 3 flow and other end of the liquid lifting passage 37 is opened at inside of the gas-liquid separator 33.

Inside of the low temperature regenerator 4 is installed with a heat exchange flow path 4a communicated with inside of the gas-liquid separator 33 for making the cooling medium vapor at inside of the gas-liquid separator 33 flow. The heat exchange flow path 4a is connected with a second cooling medium vapor passage 39 for guiding the cooling medium vapor flowing at inside of the heat exchange flow path 4a heated by the low temperature regenerator 4 to the condenser 5. Further, the low temperature regenerator 4 is connected with one end of a concentrated solution passage 41 for heating the middle concentration solution flowing from the middle concentration solution passage 35 by heat of the cooling medium vapor flowing in the heat exchange flow path 4a to constitute a concentrated solution and thereafter, deliver the concentrated solution to the absorber 9. Other end of the concentrated solution passage 41 is connected to the absorber 9.

Inside of the condenser 5 is provided with a heat exchange flow path 5a connected to a cooling water passage 43 for making cooling water flow and forming a portion of a flow path of cooling water. A bottom portion of the condenser 5 is connected with one end of a cooling medium passage 45 for making a cooling medium constituted by condensing the cooling medium vapor to liquefy flow. Other end of the cooling medium passage 45 is connected with a cooling medium scattering portion, not illustrated, provided at inside of the evaporator 7. The inside of the evaporator 7 is connected with a heat exchange flow path 7a connected with a cooled or warmed water passage 47, for example, for making a cooling medium for an indoor unit cooled or heated at inside of the evaporator 7 and delivered to the indoor unit or the like for air conditioning, for example, water flow and forming a portion of a flow path of water constituting the cooling medium for the indoor unit and the cooling medium scattering portion, not illustrated, scatters the cooling medium to the heat exchange flow path 7a.

The absorber 9 is actually connected to the evaporator 7 although not illustrated in FIG. 1 and is constituted to be able to make the cooling medium vapor generated at the evaporator 7 flow to the absorber 9. Inside of the absorber 9 is provided with a heat exchange flow path 9a connected to the cooling water passage 43 and forming a portion of a flow path of cooling water. Further, inside of the absorber is provided with a concentrated solution scattering portion, not illustrated, connected with the concentrated solution passage 41 for scattering the concentrated solution to the heat exchange flow path 9a. A bottom portion of the absorber 9 is connected with one end of the diluted solution passage 27 for delivering the diluted solution generated by absorbing the cooling medium vapor generated by the evaporator 7 by the concentrated solution to the exhaust gas fired regenerator 1. Further, a bottom portion of the absorber 9 is connected with one end of a solution passage 49 connected to the middle concentration solution passage 35 for guiding the solution stored at the bottom portion of absorber 9 to the low temperature regenerator 4 via the middle concentration solution passage 35. Other end of the solution passage 39 is connected to the middle concentration solution passage 35.

The solution passage 49 is provided with a valve 49a for controlling flow of the solution to the solution passage 49. The middle concentration solution passage 35 is merged with a branch passage 51 branched from the diluted solution passage 27 on a downstream side of the merged portion of the solution passage 49 with respect to flow of the middle concentration solution. Further, a portion of the middle concentration solution passage 35 between the merged portion of the solution passage 49 and the merged portion of the branch passage 51 is provided with a high temperature heat exchanger 53 for carrying out heat exchange between the diluted solution flowing at inside of the diluted solution passage 27 and the solution flowing at inside of the low concentration solution passage 35. Further, the high temperature heat exchange 53 is provided at a portion of the diluted solution passage 27 on a downstream side of the branch passage 51 with respect to flow of the diluted solution.

A portion of the diluted solution passage 27 on a downstream side of the pump 29 with respect to flow of the diluted solution is provided with a check valve 55, further, a portion of the diluted solution passage 27 on a downstream side of the check valve 55 with respect to flow of the diluted solution and on an upstream side of the branch portion of the branch passage 51 is provided with a low temperature heat exchanger 57 or the like for carrying out heat exchange between the diluted solution flowing at inside of the diluted solution passage 27 and the concentrated solution flowing at inside of the concentrated solution passage 41. Further, the cooling water passage 43 is arranged to circulate cooling water from the absorber 9 to a cooling tower, not illustrated, by passing the condenser 5.

An explanation will be given of operation of the flow path switching device 19, the third damper 23, the gas delivering device 25 for controlling flow of the exhaust gas to the exhaust gas fired regenerator of the absorption chiller-heater having such a constitution and a characterizing portion of the invention. When the absorption chiller-heater is operated and the external machine generating the exhaust gas generates the exhaust gas, the exhaust gas is made to flow to the introducing duct 11 by closing the second damper 19b of the flow path switching device 19, opening the first damper 19a and opening the third damper 23. Thereby, the exhaust gas flows at inside of the exhaust gas fired regenerator 1 and the absorbing type water cooling and machine is driven by heat input from the exhaust gas. At this occasion, since the delivering device 25 of the embodiment is provided with the check damper 25c, when the check damper 25c is closed, the exhaust gas does not flow to the blower 25a from the exhaust duct 13 via the gas delivering passage 25b. Therefore, the check damper 25c is closed and the blower 25a is brought into a stationary state. Although the gas delivering device 25 can be constructed by a constitution of not having back flow preventing device such as the check damper 25c, in this case, the blower 25a is driven in order to prevent the exhaust gas from flowing to the blower 25a.

Further, since the absorption chiller-heater of the embodiment is provided with the directly fired regenerator 3, when a heat input amount by the exhaust gas does not satisfy a necessary heat input amount or in the case in which the absorption chiller-heater is operated when the exhaust gas is not present, the directly fired regenerator 3 is driven.

Meanwhile, when the absorption chiller-heater is not operated and the external machine generating the exhaust gas generates the exhaust gas, the exhaust gas is made to flow to the bypass duct 15 by opening the second damper 19b of the flow path switching device 19, closing the first damper 19a and closing the third damper 23. Thereby, the excess gas is made to flow into the bypass duct 15 and is prevented from flowing into the exhaust gas fired regenerator 1. However, there is a case in which the exhaust gas invades inside of the exhaust gas fired regenerator 1 via the introducing flow path 11 since leakage of the first damper 19a is brought about in view of the structure of the damper. Hence, at this occasion, air is blown into a flow path of the exhaust gas between the first damper 13a and the third damper 13 including the flow path of the exhaust gas at inside of the exhaust gas fired regenerator 1 by opening the check damper 25c and driving the blower 25a. Thereby, a pressure at inside of the flow path of the exhaust gas between the first damper 19a and the third damper 23 becomes higher than a pressure in a flow path of the exhaust gas on an upstream side of the first damper 19a with respect to flow of the exhaust gas. Therefore, the exhaust gas can be prevented from invading the exhaust gas fired regenerator 1 by leakage of the first damper 19a.

Further, when the absorption chiller-heater is not operated and the external machine generating the exhaust gas doe not generate exhaust gas, the flow path switching device 19 and the third damper 23 are not operated and the gas delivering device 25 is brought into the stationary state.

In this way, according to the absorption chiller-heater of the embodiment, the introducing duct 11 is provided with the first damper 19a and the bypass duct 15 is provided with the second damper 19b to constitute the flow path switching device 19 for switching flow of the exhaust gas. Further, the exhaust duct 13 is provided with the third damper 23 and the portion of the exhaust duct 13 between the third damper 23 and the exhaust duct fired regenerator 1 is provided with the gas delivering device 25 for blowing a gas. Further, in the case in which the absorption chiller-heater is not operated when the external machine generating the exhaust gas generates the exhaust gas, the exhaust gas can be brought into a state of flowing in the bypass flow path by closing the first damper 19a and the third damper 23 and opening the second damper 19b. At this occasion, although the blower 25a of the gas delivering device 25 is driven, the gas delivering device 25 may be able to increase pressure inside of a closed space including the flow path of the exhaust gas at inside of the exhaust gas fired regenerator between the first damper 19a and the third damper 23. Therefore, the gas volume of the blower 25a can be restrained. Further, the number of the dampers is made to be smaller than that in the related art and the constitution can be simplified. That is, the necessary gas volume of the blower can be restrained while simplifying the constitution.

Further, by enabling to restrain the gas volume of the blower, noise by the blower can be reduced, further, power consumption of the blower can be reduced.

Meanwhile, according to a constitution of providing a damper for switching a flow direction of exhaust gas at a merged portion of a side of a bypass flow path and a side of an exhaust flow path and providing gas delivering device at the exhaust flow path as in the absorption chiller-heater of the related art, it is difficult to use a three-way damper at the merged portion of the side of the bypass flow path and the side of the exhaust flow path, there is constructed a constitution of providing dampers respectively at the bypass flow path and the exhaust flow path and it is difficult to further simplify the constitution by reducing the number of the dampers. In the case of the three-way damper, as shown by FIG. 3, when a three-way damper 58 is used as flow path switching device at the merged portion 21 of the bypass duct 15 and the exhaust duct 13, by rotating to move one sheet of a movable plate 58b one side of which is connected to one shaft 58a pivoted by an actuator by constituting a rotating shaft by the shaft 58a, either of flow paths of the exhaust duct 13 and the bypass duct 15 can be closed.

Figure 3:
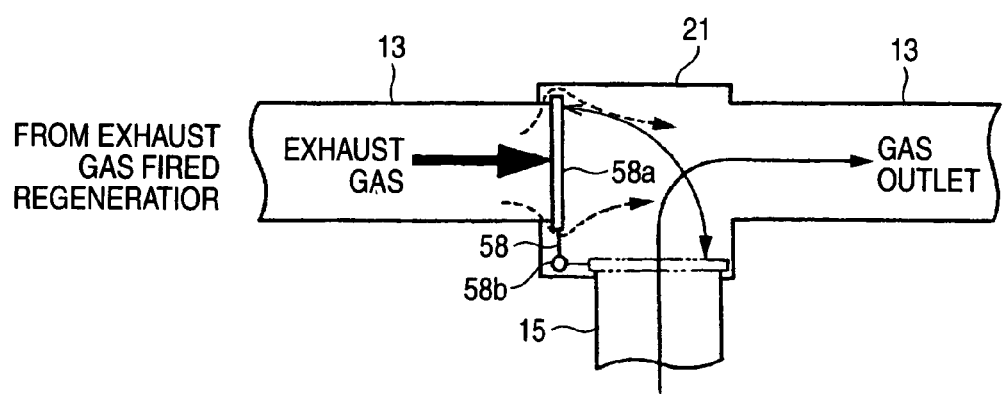
FIG. 3 is a diagram showing a case of installing a three-way damper at a flow path of exhaust gas of an absorption chiller-heater of a related art.

Therefore, when the absorption chiller-heater is not operated and the external machine generating the exhaust gas generates the exhaust gas, in the case in which the movable plate 58b of the three-way damper 58 as shown by FIG. 3 is brought into a closed state, flow of the exhaust gas pushes the movable plate 58b to a movable direction of the movable plate 58b. That is, sealing performance of the movable plate 58b which leaks even at normal time is further deteriorated, leakage of the exhaust gas is increased and therefore, according to the absorption chiller-heater of the related art, it is difficult to further simplify the constitution by reducing the number of dampers by using the three-way damper.

Figure 4:
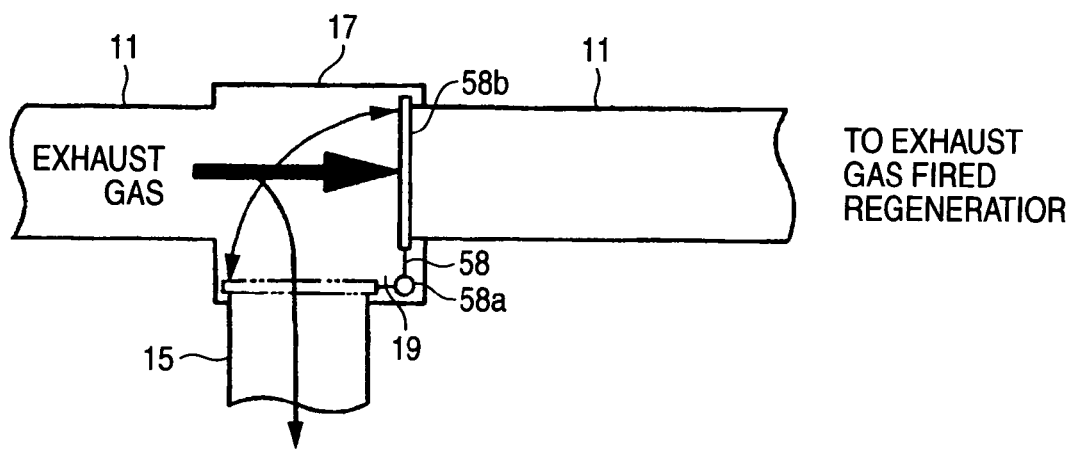
FIG. 4 is a diagram showing a case of installing a three-wary damper at a flow path of exhaust gas connected to an exhaust gas fired regenerator according to the embodiment of the absorption chiller-heater constituted by applying the invention.

In contrast thereto, according to the absorption chiller-heater of the embodiment, the flow path switching device is provided on the side of the introducing duct 11 and therefore, when the three-way damper is used, as shown by FIG. 4, the three-way damper 58 is constructed by a constitution of being provided at the branch portion 17 of the introducing duct 11 and the bypass duct 15. In this case, flow of the exhaust gas pushes the movable plate 58b of the three-way damper 58 in the closing direction and therefore, not only the sealing performance of the movable plate 58b is not deteriorated but also the sealing performance may be enhanced. Therefore, leakage of the exhaust gas is difficult to increase or reduced and therefore, the three-way damper can be used, the number of dampers can further be reduced and therefore, the constitution can further be simplified.

Further, although the constitution can further be simplified by using the three-way damper, when the flow path switching device 19 is constituted by the first damper 19a and the second damper 19b as in the embodiment, it is not necessarily needed to provide the first damper 19a and the second damper 19b at the branch portion 17, a degree of freedom of installing the first damper 19a and the second damper 19b can be increased, further, thereby, a degree of freedom of designing or installing the absorption chiller-heater can be increased.

Further, according to the constitution of providing the damper for switching flow direction of the exhaust gas at the merged portion of the side of the bypass flow path and the side of the exhaust flow path and providing the gas delivering device at the exhaust flow path as in the absorption chiller-heater of the related art, the flow of the exhaust gas cannot be switched to flow to the introducing flow path and flow to the bypass flow path and therefore, a constitution of preventing the bypass flow path from merging the exhaust flow path cannot be constructed.

Figure 5:
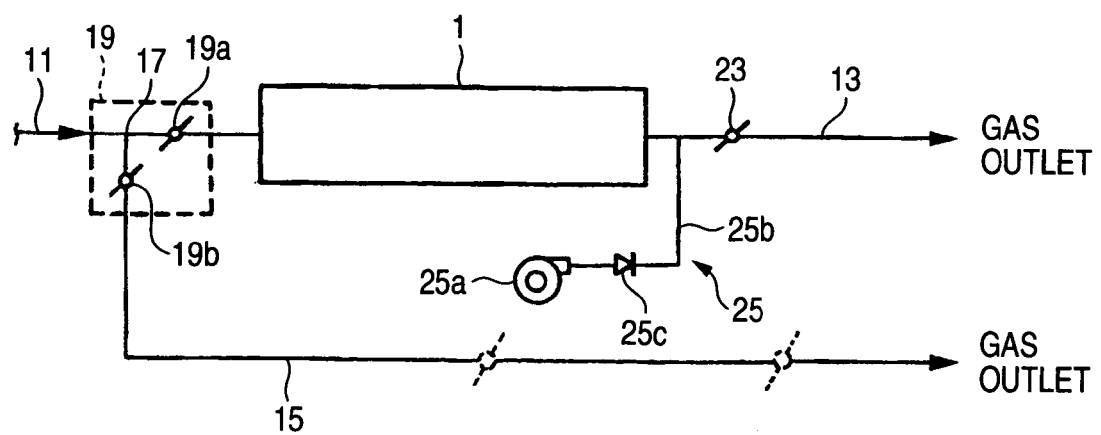
FIG. 5 is a diagram showing a modified example of the absorption chiller-heater constituted by applying the invention.

In contrast thereto, according to the absorption chiller-heater of the embodiment, the flow path switching device is provided on the side of the introducing duct 11 and therefore, the bypass flow path, that is, the bypass duct 15 needs not to merge the exhaust flow path, that is, the exhaust duct 13 and as shown by FIG. 5, there can be constructed a constitution of exhausting the exhaust gas by constituting the bypass duct 15 and the exhaust duct 13 by flow paths different from each other. In this case, the flow path switching device 19 can be constructed by a constitution of providing the three-way damper at the branch portion 17 of the introducing duct 11 and the bypass duct 15 and can also be constructed a constitution of providing the first damper 19*a* at the introducing duct 11 and providing the second damper 19*b* as the bypass duct 15. In the case of the constitution of providing the first damper 19*a* at the introducing duct 11 and providing the second damper 19*b* at the bypass duct 15, a position of installing the second damper 19*b* provided at the first duct 15 is not limited to the branch portion 17 or a vicinity of the branch portion 17 and can be installed at any position of the bypass duct 15. Further, since the degree of freedom of arranging the bypass flow path can be increased, the degree of freedom of designing or installing the absorption chiller-heater can be increased.

Further, although according to the embodiment, water is exemplified as the cooling medium for the indoor unit, various cooling media can be used as media for the indoor unit.

Further, the invention is not limited to the absorption chiller-heater having the constitution of the embodiment but is applicable to absorption chiller-heaters of various constitutions having exhaust gas fired regenerators.

According to the invention, a gas amount of a blower can be restrained while simplifying a constitution.

What is claimed is:

1. An absorption chiller-heater comprising:
   an exhaust gas fired regenerator heated by an exhaust gas;
   an introducing flow path for introducing said exhaust gas to said exhaust gas fired regenerator;
   an exhaust path flow path for exhausting said exhaust gas from said exhaust gas fired regenerator;
   a bypass flow path branched from said introducing flow path;
   a flow path switching device provided on said introducing flow path for switching a flow of said exhaust gas to said introducing flow path and said bypass flow path, said flow path switching device including at least one damper;
   a exhaust side damper provided on said exhaust flow path for cutting off said exhaust gas from flowing in said exhaust flow path; and
   a gas delivering device for blowing a gas into said exhaust flow path between said exhaust side damper and the exhaust gas fired regenerator.

2. The absorption chiller-heater according to claim 1, wherein said flow path switching device includes a first damper provided at said introducing flow path and a second damper provided at said bypass flow path.

3. The absorption chiller-heater according to claim 1, wherein said flow path switching device is a three-way damper provided at a merged portion of said introducing flow path and said bypass flow path.

* * * * *